April 5, 1927.  
P. C. P. BOOTY  
1,623,616  
REGULATING DEVICE FOR CONTROLLING THE OPERATION OF VALVES OR THE LIKE  
Original Filed Nov. 10, 1919
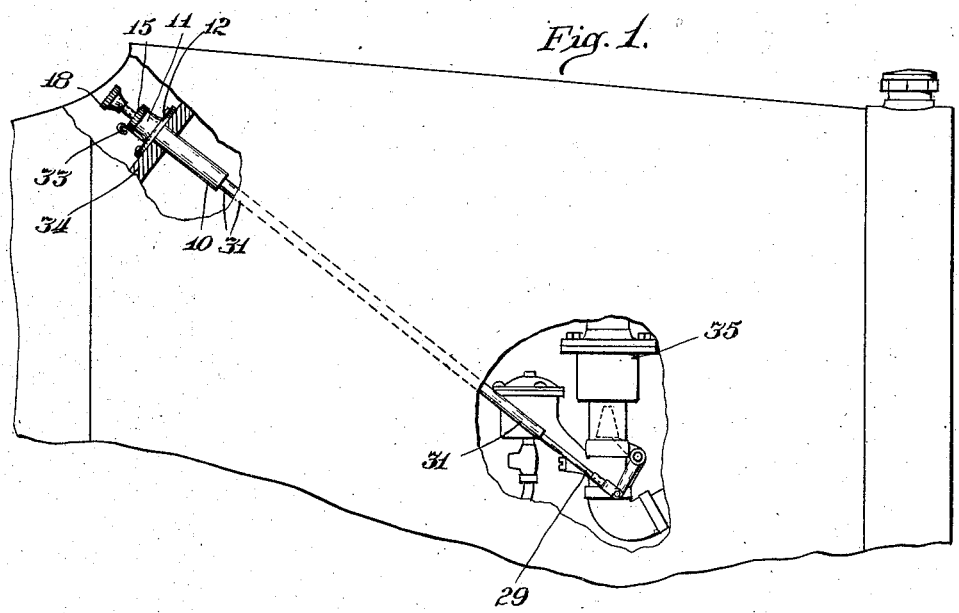
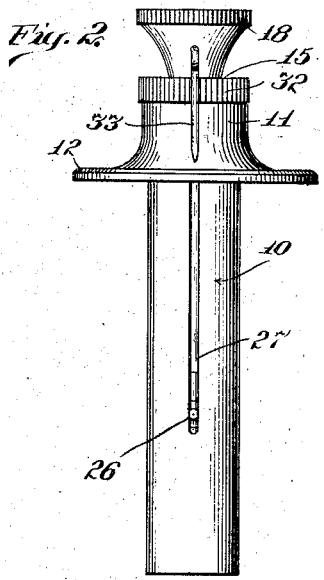
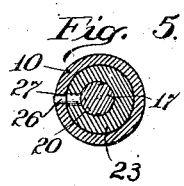
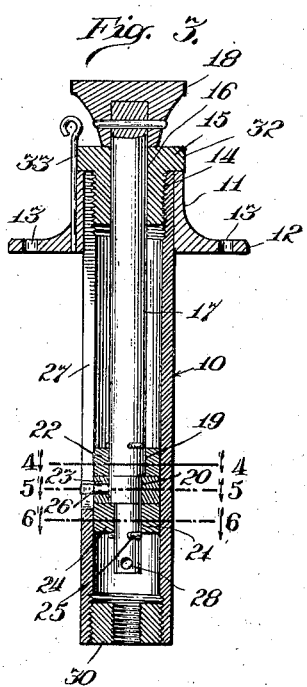
Inventor  
Philip C. P. Booty  
By Barnett & Truman  
Attorneys Patented Apr. 5, 1927.

1,623,616

UNITED STATES PATENT OFFICE.

PHILIP C. P. BOOTY, OF CHICAGO, ILLINOIS, ASSIGNOR TO WILLIAM M. BANSLEY, OF CHICAGO, ILLINOIS.

REGULATING DEVICE FOR CONTROLLING THE OPERATION OF VALVES OR THE LIKE.

Application filed November 10, 1919, Serial No. 336,785. Renewed September 27, 1926.

My invention relates to a regulating device, and more particularly to a manually operated device which may be manipulated to obtain fine adjustments, for example, of a valve, and to lock it in any position.

The device preferably comprises a cylindrical casing, a shaft or stem slidably and rotatably mounted in the casing, and means operated by the shaft whereby the shaft may be locked to the casing in any of its positions, the primary object of the invention being to provide a device of this character of simple and economical construction which may be easily manipulated to control the device or apparatus to which it is applied and which may be positively locked in any desired position against vibration or accidental displacement.

A further object of my invention is to provide in combination with a device of this character an adjustable stop for limiting the movements of the slidable shaft, the stop preferably forming a bearing for the shaft.

The invention consists in the novel arrangements, constructions and devices to be hereinafter described and claimed for carrying out the above stated objects and such other incidental objects as will appear from the following description of a preferred embodiment of the invention illustrated in the accompanying drawings, in which:

Fig. 1 is a view showing the regulating device as applied to the dashboard of an automobile and connected to the choking adjustment of a carburetor, this view merely illustrating one application of my invention;

Fig. 2 is a side elevational view, and Fig. 3 is a vertical sectional view of a device embodying the principles of my invention; and Figs. 4, 5 and 6 are sectional views taken, respectively, on the lines 4—4, 5—5 and 6—6 of Fig. 3.

Like characters of reference designate like parts in the several figures of the drawings.

Referring to the drawings, the regulating device includes a supporting member, for example, a casing or tubular element 10, the upper end of which fits snugly into the hub 11, preferably formed integrally with the flange 12. The tube 10 is preferably soldered to the hub 11. The flange 12 may be of any suitable shape and formed at any convenient angle with respect to the axis of the hub 11. In the embodiment illustrated in the drawings the flange 12 is formed at an angle of 90° to the axis of the hub 11 and is provided with perforations 13 for the insertion of suitable screws to fasten the device on a supporting member, for example, the dashboard of an automobile, as shown in Fig. 1.

The upper end of the tube 10 is formed with internal screw threads 14 which are adapted to engage the threads formed on the adjustable stop member 15. The stop member 15 is formed with a bore 16 which is adapted to receive the stem or shaft 17, thus forming a bearing for the stem or shaft. The upper end of the shaft 17 preferably is provided with a knurled knob 18 to facilitate sliding the shaft in and out of the tube 10 and to impart rotative movement to the shaft when desired. It will thus be seen that the shaft 17 is rotatable and also reciprocable in relation to the supporting member or the tube 10.

The lower end of the shaft 17 is preferably formed with the bearings 19, 20 and 21. The bearings 19 and 21 are formed concentrically with the axis of the shaft and are adapted to receive the concentric bearing rings 22 and 24, respectively. The bearing 20 is formed eccentrically to the axis of the shaft and is adapted to receive the eccentric disk 23. The rings or disks 22, 23 and 24 are preferably held on the shaft between the cotter pins 25. The eccentric disk 23 is prevented from turning with the shaft preferably by means of a pin 26 rigidly secured to the disk 23 and which projects into a longitudinally extending slot 27, formed in one side of the tube 10.

The lower end of the shaft is preferably provided with a perforation 28 to permit attaching the control wire or rod 29. If desired the lower end of the tube 10 may be provided with a bushing 30 which may be formed with internal threads adapted to receive the tube 31 which may be provided, if desired, to guide and protect the control wire 29.

The member 15 limits the downward and upward movement of the shaft 17, the perimeter of the member 15 preferably being provided with closely associated vertical notches 32 which are engaged by the spring 33 secured to the flange member 12, whereby the member 15 is resiliently held in any predetermined position.

The device may be made of any suitable material, brass being preferred.

Operation: I have shown in Fig. 1 of the drawing, merely for the purpose of illustration, my invention as embodied in a device attached to the dashboard 34 of an automobile and connected to the choking adjustment of the carburetor 35. The carburetor 35 is described and claimed in my co-pending application Serial No. 281,033, filed March 6, 1919, and is provided with certain arrangements whereby, for example, for starting purposes, a manually controlled choking adjustment may be made which brings about an enrichment of the mixture through increase in the effective size of the fuel orifice or orifices and an increased velocity of air past said orifice or orifices. As suming the device has been locked to the casing, to change the choking adjustment the shaft 17 is given a slight rotative movement in the proper direction to bring the eccentric disk 23 into alinement with the disks 22 and 24. When the eccentric disk 23 is in this position the shaft 17 may be slidably moved into or out of the tube 10 and when at the proper position the shaft may be given a slight rotative movement in either direction to bring the eccentric disk out of alignment with the concentric disks which causes the shaft to be positively locked to the tube 10, the eccentric disk 23 and the concentric disks 22 and 24 being brought into binding engagement with the sides of tube 10. When the disks are in binding engagement with the casing, the shaft, of course, is locked against longitudinal movement relative to the casing. To release the shaft a slight backward rotative movement thereof brings the eccentric disk 23 again into alinement with the concentric disks 22 and 24. The shaft is positively and effectively locked to the casing or tube 10 against vibration or accidental displacement.

The device is particularly useful in adapting a carburetor on an automobile or an aeroplane to the conditions under which the motor is operating. The operator will quickly learn from experience the proper position for ordinary operation and the adjustable stop member 15 may be set accordingly. For ordinary running conditions, the shaft will be normally in the position shown in Fig. 3. When an enrichment of the mixture is desired the shaft may be released and pulled out enough to obtain the desired results and locked in the proper position.

I have found from experience, when wire is used for connecting the device to the carburetor and the shaft is rotated to release the locking mechanism, that the wire is given a slight twist so that when the shaft is moved to the proper position the twisting action in the wire has a tendency to cause the shaft to rotate oppositely and lock itself to the casing.

It will be obvious that the invention is not limited to the adjustment of a carburetor as it may be used for many other purposes, for example, controlling the operation of a shutter of a radiator, controlling the supply of lubricating oil from the reservoir to the engine, and in fact in any situation where a delicate adjustment and positive locking of a valve or the like are essential.

I do not intend to limit my invention to the details of construction shown and described, except only in so far as certain of the appended claims are specifically so limited, as it will be obvious to those skilled in the art that various modifications may be made without departing from the principles of my invention.

I claim:

1. In a regulating device of the class described, the combination of a longitudinally reciprocable adjusting stem having an eccentric bearing portion, an elongated guide for said stem, and eccentric means mounted on said bearing portion and adapted upon a rotary movement of the stem to lock the stem relative to the guide at any point throughout its range of longitudinal movement relative to the guide.

2. In a regulating device of the class described, the combination of a longitudinally reciprocable adjusting stem having an eccentric bearing portion, an elongated guide for said stem, eccentric means mounted on said bearing portion, and means to prevent rotary movement of the eccentric means with the stem, the aforesaid parts being so arranged that upon a rotary movement of the stem, relative to the guide, the stem is locked to the guide at any point through the range of longitudinal movement of the stem.

3. A regulating device of the class described, comprising a cylindrical casing, a shaft having an eccentric bearing portion, means for slidably maintaining said shaft concentrically in said casing, and an eccentric member mounted on said bearing portion which is operable by a rotative movement of the shaft to lock the shaft to the casing.

4. A regulating device of the class described, comprising a cylindrical casing, a shaft adapted to be inserted in said casing and having an eccentric bearing portion, a disk mounted on and adapted to maintain said shaft concentrically within said casing, and an eccentric member mounted on said bearing portion which is operable by a rotative movement of the shaft to lock the shaft to the casing.

5. A regulating device of the class described, comprising a cylindrical casing, a shaft adapted to be inserted in said casing and having an eccentric bearing portion, a disk mounted on and adapted to maintain said shaft concentrically within said casing, an eccentric member mounted on said bearing portion, and means to prevent said eccentric member from rotating whereby said eccentric member is operable by a rotative movement of the shaft to lock the shaft to the casing.

6. A regulating device of the class described, comprising a cylindrical casing, a shaft adapted to be inserted in said casing and having two concentric and an intermediate eccentric bearing portion; disks mounted on said concentric bearing portions and adapted to maintain said shaft concentrically within said casing, and an eccentric member mounted on said eccentric bearing portion between said disks which is operable by a rotative movement of the shaft to lock the shaft to the casing.

7. A regulating device of the class described, comprising a cylindrical casing, a shaft adapted to be inserted in said casing and having an eccentric bearing portion, a bushing in the outer end of the casing to form a bearing for the shaft, a disk mounted on the inner end of the shaft, said disk and bushing maintaining the shaft concentrically within said casing, and an eccentric member mounted on said eccentric bearing portion which is operable by a rotative movement of the shaft to lock the shaft to the casing.

8. A regulating device of the class described, comprising a cylindrical casing, a shaft adapted to be inserted in said casing and provided with a knob on its outer end and having an eccentric bearing portion, a perforated screw plug in the outer end of the casing adapted to form a bearing for the shaft, a disk mounted on the inner end of the shaft, said disk and bearing maintaining the shaft concentrically within said casing, and an eccentric member mounted on said eccentric bearing portion which is operable by a rotative movement of the shaft to lock the shaft to the casing, said screw plug forming an adjustable stop to limit the longitudinal movement of said shaft.

9. A regulating device of the class described, comprising a cylindrical casing, a shaft adapted to be inserted in said casing and provided on its outer end with a knob and having an eccentric bearing portion, a perforated screw plug in the outer end of the casing adapted to form a bearing for the shaft, a disk mounted on the inner end of the shaft, said disk and bearing maintaining the shaft concentrically within the casing, and an eccentric member mounted on said eccentric bearing portion which is operable by a rotative movement of the shaft to lock the shaft to the casing, said screw plug forming an adjustable stop to limit the longitudinal movements of said shaft, said screw plug being formed with a plurality of peripheral notches, and a spring carried by said casing adapted to engage the notches on said screw plug.

10. A regulating device of the class described comprising a cylindrical casing, a shaft adapted to be inserted in said casing and provided with a knob on its outer end and having an eccentric bearing portion, a perforated screw plug in the outer end of the casing adapted to form a bearing for the shaft, a disk mounted on the inner end of the shaft, said disk and bearing maintaining the shaft concentrically within said casing, an eccentric member mounted on said eccentric bearing portion and means to prevent said member from rotating whereby said member is operable by a rotative movement of the shaft to lock the shaft to the casing, said screw plug forming an adjustable stop engageable by the knob on said shaft to limit longitudinal movement of the shaft.

11. A regulating device of the class described, comprising a cylindrical casing formed with a longitudinal slot, a shaft adapted to be inserted in said casing and provided with a knob on its outer end and an eccentric bearing portion, a perforated screw plug in the outer end of the casing and adapted to form a bearing for the shaft, a disk mounted on the inner end of the shaft, said disk and bearing maintaining the shaft concentrically within said casing, an eccentric member mounted on said eccentric bearing portion, means on said member adapted to engage the slot in the casing whereby said member is operable by a rotative movement of the shaft to lock the shaft to the casing, said screw plug forming an adjustable stop engageable by the knob on the shaft to limit longitudinal movement of the shaft.

12. In a regulating device of the class described, the combination of a longitudinally reciprocable adjusting stem having an eccentric cam, a guide for the stem extending lengthwise of the latter, and a member in which the cam is journaled, said member being movable longitudinally with the stem and held against rotary movement and operable by the cam to frictionally interlock with the guide at any point of its adjustment along the latter for locking the adjusting stem at any point in its range of longitudinal adjustment.

PHILIP C. P. BOOTY.